(12) United States Patent
Kishi

(10) Patent No.: US 7,085,895 B2
(45) Date of Patent: Aug. 1, 2006

(54) APPARATUS, SYSTEM, AND METHOD FLUSHING DATA FROM A CACHE TO SECONDARY STORAGE

(75) Inventor: Gregory Tad Kishi, Oro Valley, AZ (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 10/655,924

(22) Filed: Sep. 5, 2003

(65) Prior Publication Data

US 2005/0055512 A1    Mar. 10, 2005

(51) Int. Cl.
*G06F 12/00* (2006.01)

(52) U.S. Cl. ............... 711/135; 711/133; 711/136; 711/158; 711/160; 711/113; 711/118

(58) Field of Classification Search ................. None
See application file for complete search history.

(56) References Cited

U.S. PATENT DOCUMENTS

| | | | | |
|---|---|---|---|---|
| 5,394,531 A | * | 2/1995 | Smith | 711/136 |
| 5,566,315 A | * | 10/1996 | Milillo et al. | 711/113 |
| 5,895,488 A | * | 4/1999 | Loechel | 711/135 |
| 5,907,672 A | | 5/1999 | Matze et al. | 395/182.06 |
| 5,926,834 A | | 7/1999 | Carlson et al. | 711/152 |
| 5,943,687 A | * | 8/1999 | Liedberg | 711/156 |
| 5,956,744 A | * | 9/1999 | Robertson et al. | 711/122 |
| 5,963,971 A | | 10/1999 | Fosler et al. | 711/114 |
| 6,105,037 A | | 8/2000 | Kishi | 707/201 |
| 6,269,423 B1 | | 7/2001 | Kishi | 711/113 |
| 6,282,609 B1 | | 8/2001 | Carlson | 711/112 |
| 6,339,778 B1 | | 1/2002 | Kishi | 707/200 |
| 6,349,365 B1 | * | 2/2002 | McBride | 711/133 |

(Continued)

FOREIGN PATENT DOCUMENTS

| | | |
|---|---|---|
| EP | 1202159 A2 | 10/2001 |
| JP | 200218252 | 10/2000 |

OTHER PUBLICATIONS

High Performance File System For Supercomputing Environment, H. Nishino, S. Naka, K.Ikumi; 1989.

(Continued)

*Primary Examiner*—Donald Sparks
*Assistant Examiner*—Yaima Campos
(74) *Attorney, Agent, or Firm*—Kunzler & Associates

(57) ABSTRACT

An apparatus, system, and method is provided for flushing data from a cache to secondary storage. The apparatus, system, and method identifies predefined high priority cache structures and predefined low priority cache structures. The apparatus, system, and method selectively flushes low priority cache structures according to a first scheme when the cache is under a demand load and according to a second scheme when the cache is under substantially no demand load. The first scheme is defined to flush low priority cache structures as efficiently as possible and the second scheme is defined to flush low priority cache structures in a less efficient manner.

26 Claims, 6 Drawing Sheets

U.S. PATENT DOCUMENTS

| | | | |
|---|---|---|---|
| 6,507,883 B1 | 1/2003 | Bello et al. ..................... 711/4 |
| 6,629,201 B1* | 9/2003 | Dempsey et al. ........... 711/113 |
| 6,658,533 B1* | 12/2003 | Bogin et al. ................ 711/135 |
| 6,742,084 B1* | 5/2004 | Defouw et al. ............. 711/133 |
| 6,922,754 B1* | 7/2005 | Liu et al. .................... 711/138 |
| 2003/0004980 A1 | 1/2003 | Kishi et al. ................. 707/204 |
| 2004/0024971 A1* | 2/2004 | Bogin et al. ................ 711/135 |
| 2004/0117441 A1* | 6/2004 | Liu et al. .................... 709/203 |
| 2004/0168028 A1* | 8/2004 | Ciemiak ..................... 711/125 |

OTHER PUBLICATIONS

The IBM Virtual Tape Server: Making tape controllers more autonomic, G. T. Kishi; IBM J. Res & Dev. vol. 47 No. 4 Jul. 2003.

Virtual Tap Servers A Foundation for Growth, John McArthur, www.idc.com.

Autonomic Coumputing, by W. Wayt Gibbs, scia.com, Jun. 25, 2003.

* cited by examiner

APPARATUS, SYSTEM, AND METHOD FLUSHING DATA FROM A CACHE TO SECONDARY STORAGE

BACKGROUND OF THE INVENTION

1. Field of the Invention

The invention relates to data storage systems. Specifically, the invention relates to apparatus, systems, and methods for flushing data from a cache to secondary storage.

2. Description of the Related Art

High density, removable media storage libraries are used to provide large quantities of storage in a computer system. Typically, such data storage systems are employed for backup or other secondary storage purposes, but may be used as primary storage in circumstances that are conducive to sequential data access and the like.

The data is stored on media cartridges, such as magnetic or optical disks, that are arranged in storage bins and accessed when data on a cartridge is requested. Currently available media cartridges are capable of storing much more data than the data volume units that correspond to the size of early types of media cartridges. Volume mapping is used to create a correlation between the physical capacity of a storage cartridge (stacked volume or physical volume) and the data storage unit size (virtual volume or logical volume) of a file or block that is stored on the cartridge.

Given the available data storage capacity of a disk, volume mapping allows multiple logical volumes to be stored on a single physical volume, thereby providing an efficient use of the available storage media. A virtual tape server (VTS) is one device capable of creating and maintaining such mapping among physical volumes and logical volumes. The VTS services data storage requests from host computer systems.

A typical VTS system includes a virtual tape server and an automated media library. The library is controlled by a library manager (LM) that is similar to a workstation computer. As needed, the LM conducts the physical loading and unloading of media cartridges from physical drives. Through proper communication of the volume mapping and attributes, or constructs, a host processor and peripheral data storage equipment may access logical volumes as though they were individual physical volumes. The volume access management is provided via the VTS and LM.

A VTS system caches a plurality of logical volumes stored as files, in a cache comprised of a high speed storage device such as a direct access storage device (DASD). Typically, the DASD cache provides random access to data in one or more logical volumes. The DASD cache provides high speed access but is more expensive than the slower, less expensive, secondary storage provided through the LM. Generally, a VTS system includes less DASD cache capacity than secondary storage capacity.

The cache serves as a buffer for logical volumes corresponding to actual physical volumes of secondary storage. The logical volumes may be organized within the cache into data structures referred to as cache structures. Cache structures may have a variety of formats or configurations. A cache manager manages virtual volumes such that the most frequently requested virtual volumes remain in the cache and the least frequently requested virtual volumes are placed in secondary storage.

Initially, the cache is empty. When a host requests a virtual volume, the virtual volume is loaded from secondary storage into the cache. When a host writes a virtual volume, it is written to the cache. Eventually, the cache fills up to a predetermined threshold. As the cache fills beyond the threshold, the cache manager removes virtual volumes from the cache. Generally, the least recently used (LRU) virtual volumes are removed first.

Generally, a VTS writes a copy of a virtual volume in the cache to a secondary storage media cartridge. The copy may be written simultaneous with the writing of the virtual volume in the cache or as free space is needed in the cache. The original virtual volume is left in the cache in case additional cache hits are received for the virtual volume. When a virtual volume is written both in the cache and on secondary storage media cartridges, the virtual volume is "premigrated."

The VTS tracks metadata for virtual volumes within the cache, such as the size, type, location in cache, a pointer to the virtual volume in secondary storage, and the like. The pointer allows the VTS to readily reload, or "recall," a virtual volume permanently removed from the cache. Depending on which physical media cartridge a virtual volume is premigrated to, the recall may require as long as several minutes.

In certain VTS systems, once a virtual volume is premigrated, a cache manager may remove the virtual volume from cache to free memory space. Typically, all the storage space occupied by a premigrated virtual volume is reassigned except for the pointer to the location of the virtual volume in secondary storage. This process of freeing space in the cache is referred to herein as "stubbing." A virtual volume that has been stubbed is "migrated." The cache memory space freed by migrating the virtual volume is then used to meet the demands for DASD storage being placed on the VTS by one or more hosts.

In some circumstances, a VTS operates in a high demand environment that requires almost constant servicing of data storage requests from hosts. For example, the VTS system may provide data storage for banking applications. As mentioned above, when free space is required in the cache, the VTS frees the space as quickly and efficiently as possible. As a result, a VTS stubs the LRU virtual volumes, or files, first. Typically, the processing overhead required to stub a virtual volume is fixed. Virtual volumes may have different sizes. Consequently, when the demand for space in the cache is high, a VTS stubs the LRU virtual volume that is also the largest because this provides the most free space for the same fixed processing overhead cost required to stub a virtual volume.

Typically, demand for space in the cache is gauged by measuring when the quantity of free space in the cache drops below a free space threshold. When the free space drops below the free space threshold, the VTS stubs stored LRU virtual volumes in the order of largest to smallest. Eventually, depending on the number and size of data storage requests being handled by the VTS, once the VTS stubs a sufficient number of virtual volumes that the amount of free space available again exceeds the free space threshold, a conventional VTS system stops stubbing virtual volumes.

Unfortunately, over time, the VTS cache begins to accumulate a plurality of smaller LRU virtual volumes, because the larger LRU volumes are stubbed before the smaller LRU virtual volumes. The VTS cache may comprise substantially all small LRU virtual volumes with a few larger LRU virtual volumes. Consequently, when the demand for free space increases, meaning the amount of free space again falls below the free space threshold, the VTS operates very inefficiently. Stubbing a smaller LRU virtual volume incurs the same fixed processing overhead, but frees a smaller amount of space in the cache.

Accordingly, what is needed is an apparatus, system, and method to overcome the inefficiencies of conventional VTS stubbing. In particular, the apparatus, system, and method should identify virtual volumes that have high priority and low priority. In addition, the apparatus, system, and method should flush virtual volumes having low priority according to a first scheme during a demand load and according to a second scheme during substantially no demand load. Such an apparatus, system, and method are provided herein.

BRIEF SUMMARY OF THE INVENTION

The present invention has been developed in response to the present state of the art, and in particular, in response to the problems and needs in the art that have not yet been fully solved by currently available cache management apparatus, systems, and methods. Accordingly, the present invention has been developed to provide a process, apparatus, and system for flushing data from a cache to secondary storage that overcome many or all of the above-discussed shortcomings in the art.

An apparatus according to the present invention includes an identification module and a flushing module. The identification module identifies predefined high priority cache structures and predefined low priority cache structures. An attribute stored with the cache structure or tracked using a separate data structure may indicate the priority of a cache structure. The flushing module may use different flushing schemes to manage the cache structures under different circumstances because the cache structures have different priorities.

The flushing module selectively flushes cache structures. Preferably, the low priority cache structures are flushed according to a first scheme in response to a higher demand load and according to a second scheme in response to a lower or substantially no demand load. In one embodiment, the high priority cache structures and low priority cache structures are flushed according to the same scheme in response to a demand load. The first scheme may comprise cache structures that are LRU and largest in size. In response to the lower demand load, only the low priority cache structures are flushed according to a second scheme that is opposite of the first scheme. The second scheme may comprise cache structures that are LRU and smallest in size.

The apparatus may include a sort module configured to order the high priority cache structures and the low priority cache structures according to a first criteria and a second criteria. In addition, the sort module may order the high priority cache structures and the low priority cache structures according to priority. The first criteria may comprise a least-recently-used algorithm and the second criteria may comprise a size algorithm. By sorting the cache structures, selection of a cache structure for flushing is facilitated.

A system of the present invention is also presented for flushing data from a cache to secondary storage. In particular, the system, in one embodiment, includes a storage manager, a media library, and a cache manager. The storage manager transfers data between a host and a plurality of logical volumes. The logical volumes correspond to one or more physical volumes and are identifiable as high priority and low priority. The media library transfers data between a direct access storage device cache that caches logical volumes and one or more physical volumes. The cached logical volumes may be stored in cache structures.

The cache manager manages logical volumes stored in the direct access storage device cache. The cache manager selectively flushes low priority logical volumes from the direct access storage device cache according to a first scheme in response to a higher demand load. In response to a lower demand load, low priority logical volumes are flushed according to a second scheme. In one embodiment, the first scheme selects the low priority logical volume that frees a greater amount of space and the second scheme selects the low priority logical volume that frees a lesser amount of space.

A process of the present invention is also presented for flushing data from a cache to secondary storage. In one embodiment, the process includes identifying predefined high priority cache structures and low priority cache structures. Cache structures may be designated as high priority or low priority by a user, an application, a system, or the like. Next, low priority cache structures are selectively flushed according to a first scheme in response to a higher demand load and according to a second scheme in response to a lower demand load.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
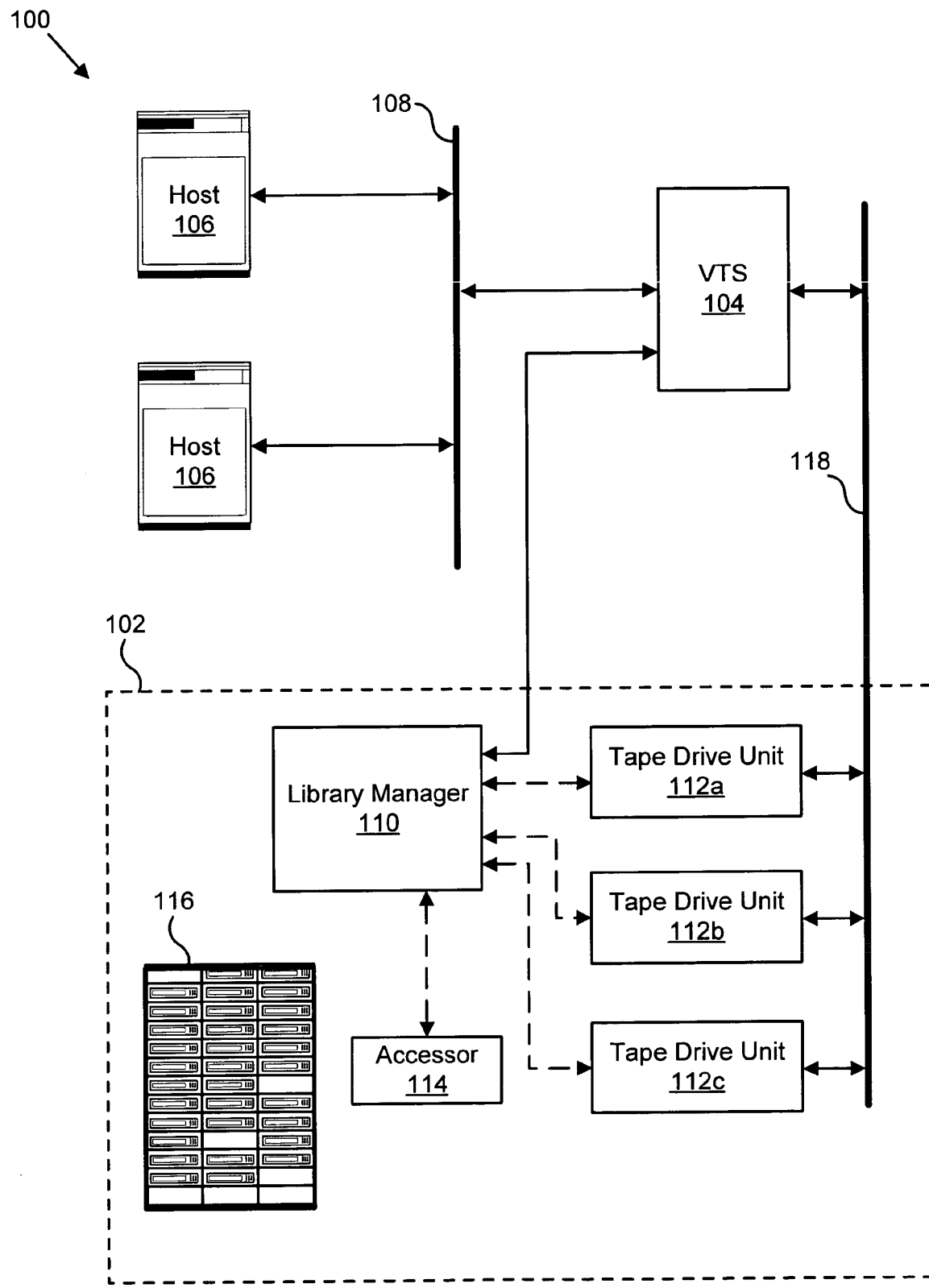
FIG. 1 is a schematic block diagram illustrating one embodiment of a representative data storage system suitable for implementing the present invention.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 7B, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

FIG. 1 illustrates a schematic block diagram of one embodiment of a representative virtual tape system 100 in accordance with the present invention. The system 100 includes an automated library unit 102, at least one VTS 104, and at least one host 106. Each host 106 may be a mainframe computer. Alternatively, the hosts 106 may be servers or personal computers using a variety of operating systems. The host 106 and the VTS 104 are connected via a storage area network (SAN) 108 or similar communications channel.

The automated tape library unit 102 includes a library manager 110, one or more data drive devices, which may be tape drive units 112, an accessor 114, and a plurality of media cartridges 116. The plurality of media cartridges 116 may be stored in one or more media cartridge storage bins (not shown).

The library manager 110, which includes at least one computing processor, is interconnected with, and controls the actions of, the tape drive units 112 and the accessor 114. The library manager 110 typically also includes one or more hard disk drives (not shown) for memory storage, as well as, a control panel or keyboard (not shown) to provide user input. The control panel may be a computer in communication with the library manager 110 so that a user can control the operating parameters of the automated tape library unit 102 independently of the host 106.

In FIG. 1, three tape drive units 112a, 112b, and 112c are shown. The present invention is operable with one or any number of tape drive units 112. The tape drive units 112 may share one single repository of cartridges 116. Alternatively, the tape drive units 112 may independently correspond to and utilize multiple repositories of cartridges 116. The tape drive units 112 may advantageously be distributed over multiple locations to decrease the probability that multiple tape drive units 112 will be incapacitated by a disaster in one location.

The interconnections between the library manager 110, the tape drive units 112, and the accessor 114 are shown as dashed lines to indicate that the library manager 110 transmits and receives control signals, rather than data to be stored or retrieved, to the tape drive units 112 and/or the accessor 114. Data for storage or retrieval may instead be transmitted directly between the VTS 104 and the tape drive units 112 via a network 118, which may be a storage area network (SAN), a local area network (LAN), wide area network (WAN), or a different type of network, such as the Internet or a direct connection between the VTS 104 and the tape drive units 112.

The accessor 114 may be a robotic arm or other mechanical device configured to transport a selected cartridge 116 between a storage bin and a tape drive unit 112. The accessor 114 typically includes a cartridge gripper and a bar code scanner (not shown), or similar read system, mounted on the gripper. The bar code scanner is used to read a volume serial number (VOLSER) printed on a cartridge label affixed to the cartridge 112. In alternative embodiments, the tape drive units 112 may be replaced by optical disk drives or other magnetic drives. Similarly, the cartridges 116 may contain magnetic media, optical media, or any other removable media corresponding to the type of drive employed.

Figure 2:
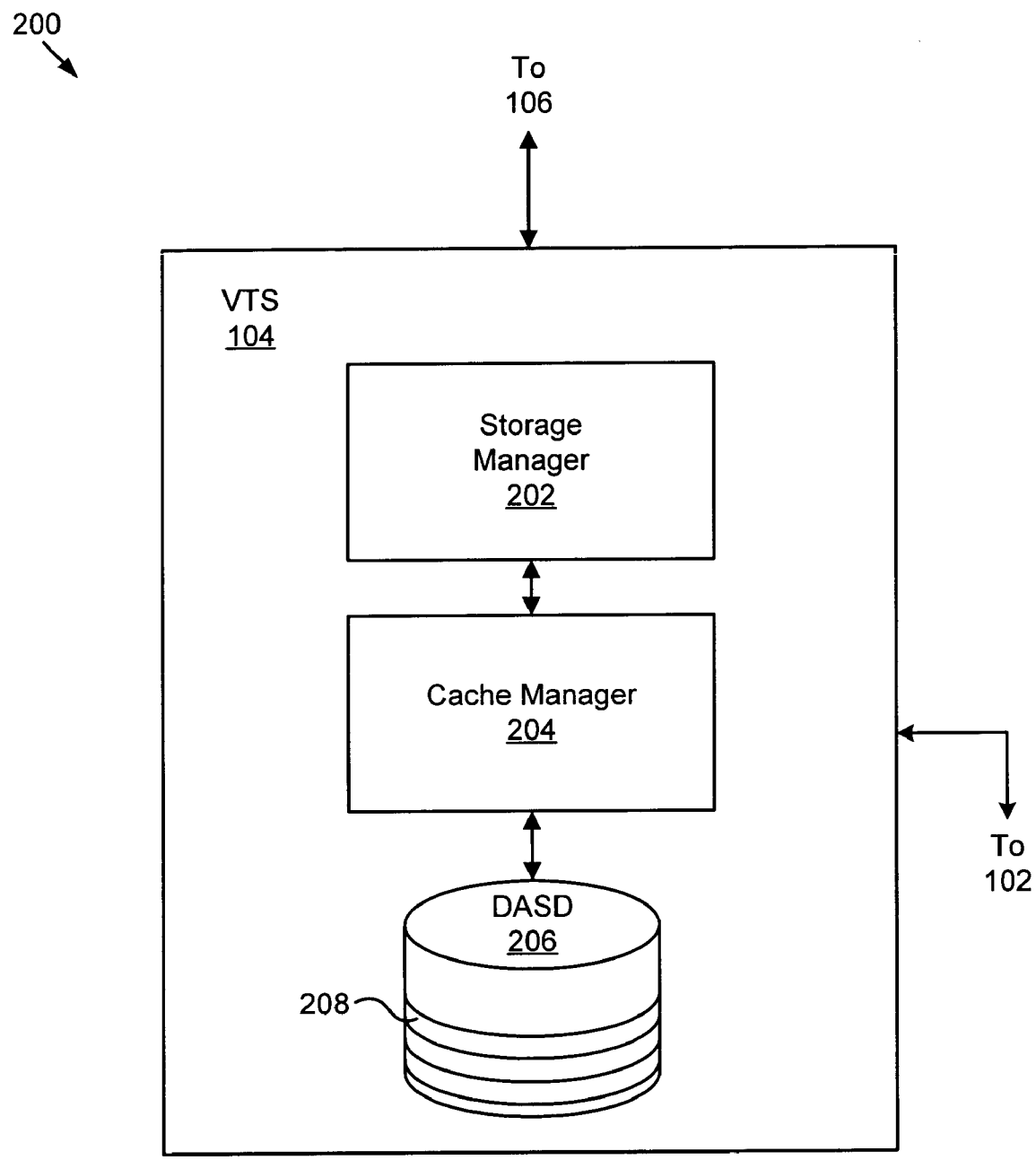
FIG. 2 is a schematic block diagram illustrating one embodiment of a of a system in accordance with the present invention.

FIG. 2 illustrates a schematic block diagram depicting one embodiment of a system 200 for flushing data from a cache to secondary storage. The system 200 may be implemented in the VTS 104 of FIG. 1. The VTS 104 may take the form of a computer with a bus, processor, memory, or the like.

These elements have been omitted from FIG. 2 to more clearly depict the various executable modules and data blocks of the VTS 104.

As shown, the VTS 104 includes a storage manager 202, a cache manager 204, and at least one direct access storage device (DASD) cache 206. The DASD cache 206 may take the form of one or more virtual tape drives that contain data in the form of a logical, or virtual, volume 208. In certain embodiments, a logical volume 208 may be organized and stored within a cache structure 208 of the cache 206. As used herein, logical volume 208 and cache structure 208 are used interchangeably and both refer to a data structure in the cache 206. Other executable modules and data blocks may also be present but are omitted to focus on the present invention.

The storage manager 202 transfers data between a host 106 and a plurality of virtual, or logical, volumes 208. The virtual volumes correspond to one or more physical volumes. Each virtual volume is identified as a low priority logical volume or a high priority logical volume.

The storage manager 202 handles the actual DASD cache 206 read and write commands from the host 106. The storage manager 202 also controls the interface communications between the DASD cache 206 and the drive devices 112 of the automated library unit 102. The automated library unit 102 is one example of a media library configured to transfer data between cached logical volumes 208 and one or more physical volumes such as media cartridges 116.

The DASD cache 206 stores a plurality of virtual volumes 208 using high speed storage devices that allow for direct addressing of data. In one embodiment, the DASD cache comprises a plurality of disk drives. The disk drives may be organized as a Redundant Array of Inexpensive Disks (RAID). Alternatively, a plurality of independent, high capacity, high speed disk drives may implement the DASD cache 206.

The cache manager 204 manages free and allocated space within the DASD cache 206. The cache manager 204 may control premigration and migration, or stubbing, of cached virtual volumes 208. Typically, the cache manager 204 monitors the amount of free and allocated space within the DASD cache 206. Preferably, the cache manager 204 automatically migrates virtual volumes 208 to secondary storage to ensure that sufficient free space is available to handle data write requests from hosts 106.

Figure 3:
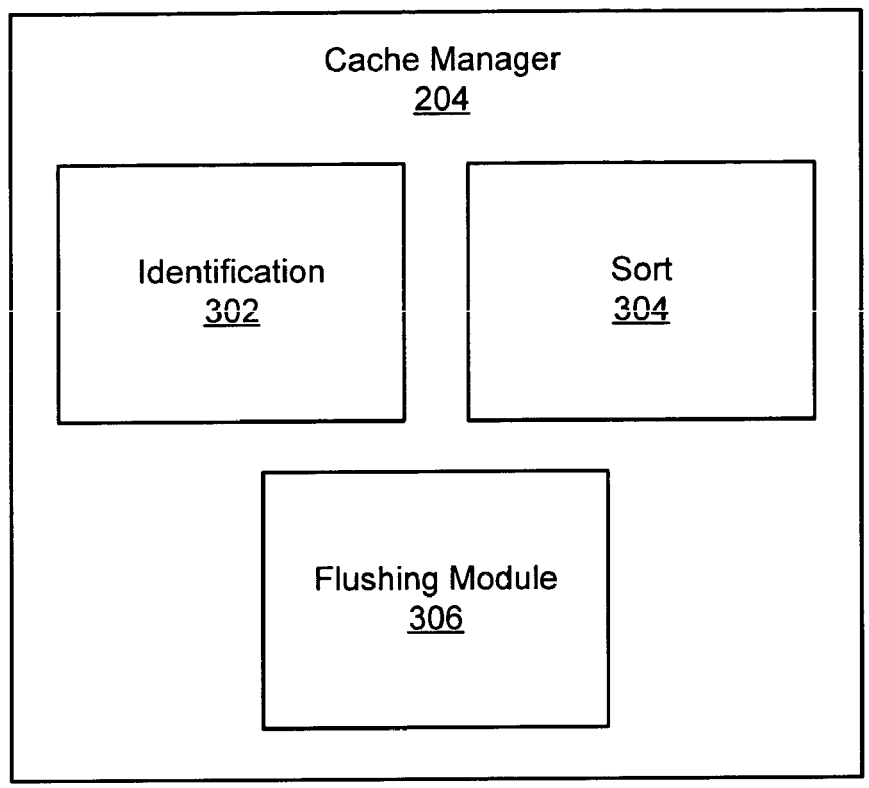
FIG. 3 is a block diagram illustrating one embodiment of a cache manager in accordance with the present invention.

FIG. 3 is a block diagram illustrating a cache manager 204 of FIG. 2 in greater detail. The cache manager 204 includes an identification module 302, a sort module 304, and a flushing module 306. In a preferred embodiment, logical volumes 208 stored in the DASD cache 206 are predefined as high priority or low priority. The identification module 302, sort module 304, and flushing module 306 cooperate to selectively flush low priority logical volumes 208 according to a first scheme in response to a higher demand load and according to a second scheme in response to a lower demand load. In one embodiment, the higher demand load is deemed to be any demand and the lower demand is deemed to be substantially no demand. Of course the higher and lower demand loads may be any level of demand, with the main defining characteristic being that the higher demand load is greater than the lower demand load.

Preferably, virtual volumes written to the DASD cache 206 are premigrated as soon as the automated library unit 102 is ready to perform this task. Migration of a virtual volume 208 to a media cartridge 116 as used hereinafter means, and is one example of, "flushing data from a cache to secondary storage." Flushing data means that the data is properly copied and accounted for in secondary storage such that the storage space in the cache previously occupied by the data may be reallocated for another virtual volume 208 most recently written to the cache 206.

A media cartridge 116 is but one example of secondary storage. As used herein, secondary storage means a storage media that provides data access that is slower than data access rates from the cache. Typically, secondary storage media is removable, more robust, more permanent, and includes more storage capacity than storage provided by the cache. Those of skill in the art will recognize that the present invention may be practiced with any storage media being used as secondary storage in relation to a cache.

In the depicted embodiment, the identification module 302 identifies predefined low or high priority logical volumes 208. In a preferred embodiment, logical volumes 208 are one example of a cache structure 208 that may be stored in a cache such as a DASD cache 206. A cache structure 208 is any data structure, object, or the like configured to facilitate management of groups of data within the cache.

Preferably, the cache structures 208 are of variable sizes that correspond to variable size logical volumes 208. A logical volume 208 may have different sizes due to legacy applications which write full "physical" volumes in which the size depends on the number of records being written. In addition, the size of logical volumes 208 may differ due to the compression ratio used in storing the data. For example, textual data typically compresses to occupy less storage space than graphics data.

Cache structures 208 are predefined as high priority or low priority. The priority of a cache structure 208 may be assigned by a storage system 200, application, or user according to a variety of criteria. Preferably, the priority is assigned by a user when a virtual volume 208 is first defined.

Typically, a high priority virtual volume 208 contains data for which it is desired that the cache manager 204 retain in cache 206 as long as possible before additional host 106 write requests require the cache manager 204 to flush the data contained in the high priority virtual volume 208. A low priority virtual volume 208 typically contains less critical data that the cache manager 204 may retain in the cache 206 or flush the whenever convenient for the cache manager 204 to do so.

Reasons for defining a virtual volume 208 as high or low priority typically involve the anticipated need of a user or application to access data stored in the virtual volume 208 in the near future. For example, a virtual volume 208 that stores recent customer banking data may be accessed within the next few days and may be designated as a high priority virtual volume 208. A virtual volume 208 that stores dated map data for archival purposes may not be accessed for years and may be designated as a low priority virtual volume 208.

In one embodiment, a cache structure 208 may include an indicator of the predefined priority. The indicator may be stored with the cache structure 208. Alternatively, another attribute of a cache structure 208 such as a timestamp may be used to distinguish high priority cache structures 208 from low priority cache structures 208. For example, for low priority cache structures 208, the timestamp for the last time the cache structure 208 was accessed may be artificially altered such that the cache structure 208 is artificially older than any other high priority cache structures 208.

In certain embodiments, the cache manager 204 includes a sort module 304. The sort module 304 orders the cache structures 208 to facilitate flushing of cache structures 208. In one embodiment, the sort module 304 maintains a data structure, or ordered list, such as an array, linked list, queue, or the like. The ordered list preferably stores pointers to the cache structures 208 within the cache 206. The sort module 304 may maintain one ordered list for high priority cache structures 208 and one ordered list for low priority cache structures 208. Alternatively, the sort module 304 may maintain a single ordered list of high priority cache structures 208 and low priority cache structures 208.

Preferably, the sort module 304 orders the predefined high priority cache structures 208 and predefined low priority cache structures 208 according to a first criteria and a second criteria. In one embodiment, the first criteria comprises an algorithm that determines the least recently used (LRU) cache structure 208. The second criteria may determine the largest cache structure 208. The sort module 304 provides one or more ordered lists that facilitate flushing of cache structures 208. In embodiments that include a sort module 304 identifying the next cache structure 208 for flushing, this involves a simple traversal of an ordered list.

The flushing module 306 flushes cache structures 208 from the cache 206. Specifically, the flushing module 306 selectively flushes low priority cache structures 208 according to a first scheme in response to a demand load and according to a second scheme in response to substantially no demand load. Preferably, the flushing module 306 also flushes high priority cache structures 208, if necessary, according to the first scheme in response to a demand load.

The flushing module 306 performs the processing overhead necessary to properly flush the cache structure 208 such that the cache structure 208 is available for recall when requested. Typically, the processing overhead is a fixed set of steps that require substantially the same amount of processing time for each flushed cache structure 208. In one embodiment, the processing overhead includes restructuring of metadata associated with the data in the cache 206, updating status and location information for the cache structure 208 in databases for example within the automated library unit 102, and in certain embodiments storing summary information and pointers to the cache structure 208 to facilitate recall and status inquiries by a host 106.

Figure 4:
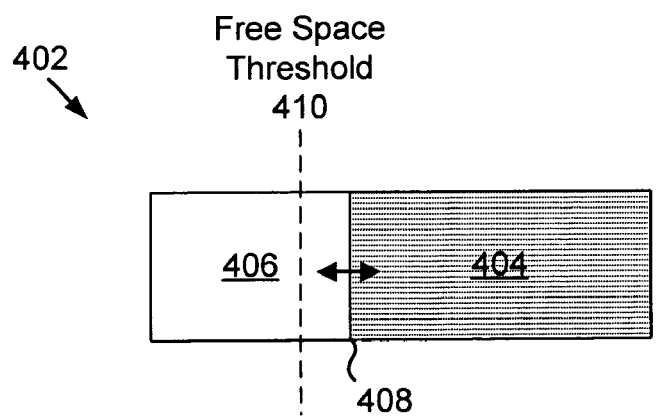
FIG. 4 is a block diagram illustrating a free space threshold within a cache in accordance with the present invention.

Referring now generally to FIG. 3 and specifically to FIG. 4, operation of one embodiment of the flushing module 306 will be described. FIG. 4 illustrates a logical representation of storage space 402 within a DASD cache 206. The storage space 402 is divided into allocated space 404 and unallocated, or free space 406. The boundary 408 moves to the left as more and more data is written to the DASD cache 206. The boundary 408 moves to the right as more and more data is made free by flushing of cached structures 208.

As mentioned above, a conventional VTS migrates data from a cache as additional space is needed, in response to a demand load placed on the VTS. As used herein, a higher demand load may occur when the hosts 106 have sent a sufficient number of requests to write logical volumes 208 to the DASD cache 206 that free space 406 in the DASD cache 206 has decreased below a free space threshold 410.

A free space threshold 410 is a boundary that defines the minimum amount of free space 406 that should exist before a VTS begins flushing cache structures 208 such as logical volumes 208 to make room for more recently written logical volumes 208. In certain embodiments, a free space threshold 410 may be predefined. Alternatively, a user may configure and adjust the free space threshold 410.

If the amount of free space 406 remains greater than the free space threshold 410, the VTS may be deemed to have a lower demand load. When a connected VTS is under substantially no demand load, the conventional VTS does not migrate any data from the cache. Instead, the data is retained to allow for cache hits to satisfy data requests. The period of time of lower demand load may be referred to as "idle time," a duration of time in which components of a conventional VTS involved in cache management are not flushing cache structures. If a conventional VTS flushed cache structures during "idle time," the benefits of caching would be lost, as all cached virtual volumes may eventually be flushed or migrated from the cache. Consequently, subsequent requests for a flushed virtual volume may result in a costly recall of cache structures.

In contrast, as described above, the flushing module 306 of the present invention utilizes the "idle time" to flush low priority cache structures 208 according to a second scheme. Preferably, if the flushing module 306 flushes substantially all low priority cache structures 208 during successive "idle times," once all low priority cache structures 208 have been flushed, the flushing module 306 performs no additional flushing of cache structures 208 during subsequent "idle times." In this manner, the benefits of caching are preserved, and "idle time" is used efficiently to clear a DASD cache 206 of low priority cache structures 208 such as small cache structures 208 which are inefficient to flush when there is a higher demand load.

Figure 5:
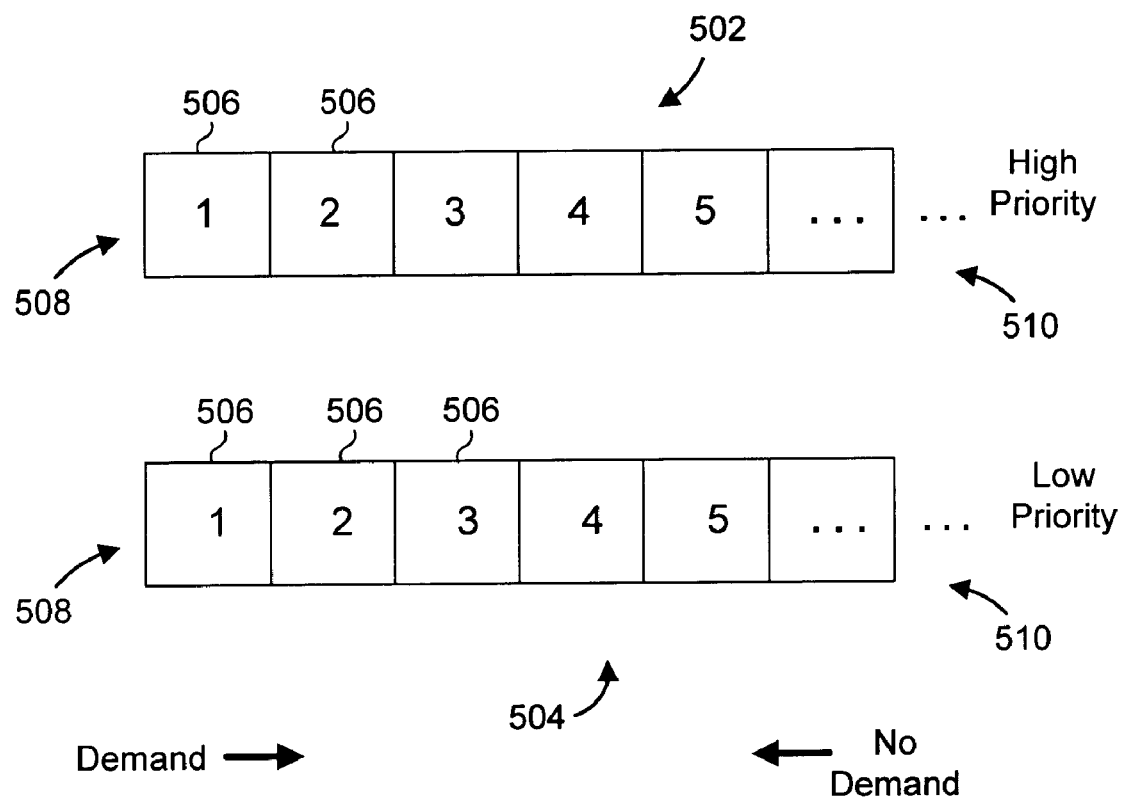
FIG. 5 is a block diagram illustrating one embodiment of data structures for managing high and low priority cache structures within a cache in accordance with the present invention.

FIG. 5 illustrates a representative example of ordered lists that certain embodiments of the invention may utilize for flushing data from a cache to secondary storage. In one embodiment, a high priority ordered list 502 orders high priority cache structures 208 and a low priority ordered list 504 orders low priority cache structures 208. While two ordered lists are illustrated, those of skill in the art will readily recognize that a single data structure or a plurality of data structures may be used to order and track cache structures 208. In addition, those of skill in the art will recognize numerous methods for tracking and ordering cache structures 208 in a cache 206 both directly and indirectly. All of these methods are considered to be within the scope of the present invention.

Preferably, the high priority ordered list 502 stores pointers 506 that uniquely identify high priority cache structures 208. A low priority ordered list 504 stores pointers 506 identifying low priority cache structures 208. The ordered lists 502, 504 include a front 508 and a back 510. Preferably, the cache manager 204 is configured to select a cache structure 208 to be flushed by traversing the appropriate ordered list 502, 504 either from the front 508 or from the back 510.

In managing a cache, it is desirable to maximize the number of cache hits to satisfy data requests from hosts 106. In other words, the number of recalls of data, such as virtual volumes 208 from slower secondary storage should be minimized. In this manner, a cache provides high speed response to data requests.

If data must be removed from the cache, to make room for new data to be written, it is desirable that the least-recently-used (LRU) cache structure be removed first because there is a high likelihood that a subsequent data request will request data from the most-recently-used cache structure. In certain embodiments, a sort module 304 orders the pointers 506 in the high priority ordered list 502 and low priority ordered list 504 according to an LRU algorithm, or scheme.

For example, a LRU high priority cache structure 208 may be identified by a pointer 506 in position 1 in the ordered list 502, the next LRU high priority cache structure 208 may be identified by a pointer 506 in position 2, and so forth until all the high priority cache structures 208 are accounted for within ordered list 502. Similarly, low priority cache structures 208 are ordered using pointers 506 such that the LRU low priority cache structure 208 is in position 1, and the next LRU low priority cache structure 208 is in position 2.

In addition, it is desirable that cache structures are flushed in a minimal amount of time and free a maximum amount of storage space, especially, if the time required to flush any cache structure is essentially the same. So, in addition to a first criteria such as an LRU algorithm, cache structures 208 may also be ordered according to a second criteria such as a size algorithm. In alternative embodiments, cache structures 208 may be substantially the same size, but incur different lengths of processing time to flush the cache structure 208. Consequently, the first criteria and second criteria may differ depending on which characteristics of cache structures 208 provide for optimal caching.

In one embodiment, sort module 304 orders the cache structures 208 of the ordered lists 502, 504 according to size such that the largest and LRU cache structures 208 are nearest to the front ends 508. Preferably, when a VTS 104 experiences a demand load, the cache manager 204 selects and flushes cache structures 208 by moving from front 508 to back 510. In addition, the cache manager 204 flushes all cache structures 208 within the low priority ordered list 502 before flushing any cache structures 208 from the high priority ordered list 504. In this manner, when free space 406 is most needed, the largest quantities of free space 406 are freed as quickly as possible. In addition, high priority cache structures 208 are retained as long as possible.

As mentioned above, flushing cache structures 208 that are the largest and LRU may result in an accumulation of smaller, LRU cache structures 208. These cache structures 208 incur the same processing overhead as larger cache structures 208, but provide a smaller amount of free space 406. To resolve this problem, a cache manager 204 according to the present invention utilizes "idle time," when there is a lesser demand for free space 406, to flush low priority cache structures 208 in an order that is the inverse of the order used to flush low priority cache structures 208 when a demand exists. Accordingly, in one embodiment, the smaller low priority cache structures 208 are flushed during the "idle time." In this manner, fewer low priority cache structures 208 of small size impede efficient operation of the cache 206 when there is a higher demand load.

In one embodiment, given by way of example due to the processing overhead, low priority cache structures 208 in the ordered list 504 having a size greater than about four kilobytes are flushed during "idle time." The ordered lists 502, 504 may track logical volume 208 that can be stubbed. Other master lists (not shown) may track all cache structures 208 within the cache 206. If the size of a low priority cache structure 208 is about the same size as a stubbed logical volumes 208 (for example less than about four kilobytes), the low priority cache structure 208 may simply be marked as stubbed and may not be included in the ordered lists 502, 504. Accordingly, very small cache structures 208 may not be involved in the cache management for efficiency reasons.

In FIG. 5, when there is substantially no demand for free space 406, the cache manager 204, or an other similar module, flushes low priority cache structures 208 in ordered list 504 from the back 510 to the front 508. If all the low priority cache structures 208 are flushed during "idle time," the cache manager 204 stops flushing cache structures 208 during "idle time" until more low priority cache structures 208 exist in the cache 206. So, depending on demand load, the ordered list 504 may be traversed from front 508 to back 510 or from back 510 to front 508.

Figure 6:
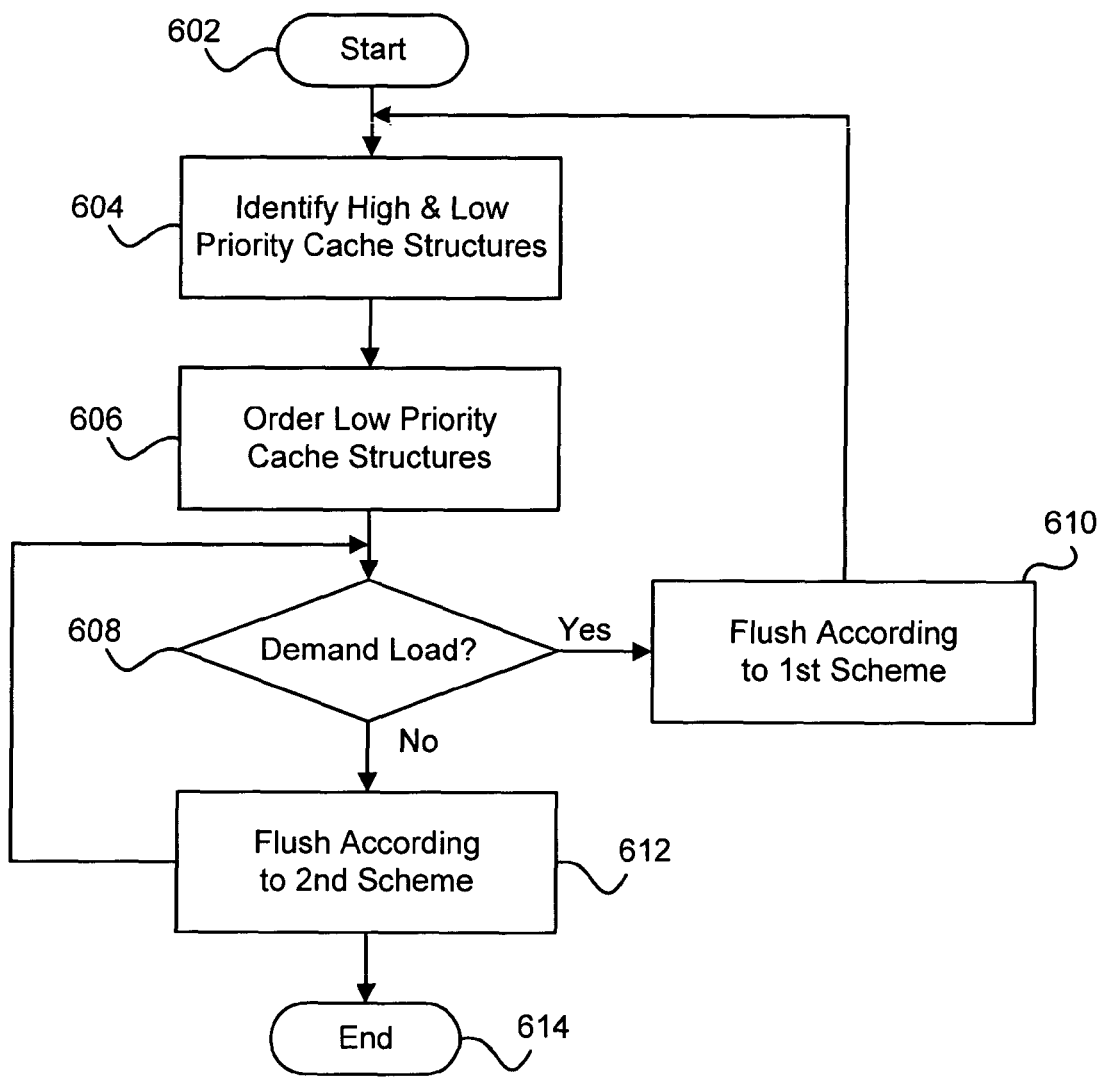
FIG. 6 is a schematic flow chart illustrating a method for flushing data from a cache to secondary storage according to one embodiment of the present invention.

FIG. 6 illustrates a method 600 for flushing data from a cache to secondary storage. The method 600 starts 602 when a VTS 104 begins populating and maintaining a cache 206. Preferably, cache structures 208 that are loaded into the cache 206 are predefined as low priority or high priority by a host 106, a user, an application, or the like.

First, cache structures 208 within the cache 206 are identified 604 as either high priority or low priority. As mentioned above, a priority designation may be made at the time the cache structure 208 is initially created. In certain embodiments, the low priority data structures 208 may be ordered 606 according to a criteria such as size. Ordering and identifying of cache structures 208 may be conducted on a continual basis as cache structures are defined and added to a cache 206.

Next, a determination 608 is made whether the VTS 104 is experiencing a higher demand load. As mentioned above, a demand load may be defined as the amount of free space 406 within the cache 206 dropping below a free space threshold 410. If there is a demand load, a low priority cache structure 208 is flushed 610 according to a first scheme. In one embodiment, once a low priority cache structure 208 is flushed 610, the method 600 may return to identifying 604 high and low priority cache structures 208.

If there is a lesser demand load, a low priority cache structure 208 is flushed 612 according to a second scheme. Once the low priority cache structure 208 is flushed, the method 600, in one embodiment, returns to determining 608 the demand load. Alternatively, the method 600 may return to identifying 604 high and low priority cache structures 208. In this manner, operation of the present invention does not unduly impede cache flushing should the demand load change quickly. Alternatively, in certain embodiments the amount of "idle time" may be estimated. From the estimated "idle time" the number of low priority cache structures 208 flushable within the "idle time" is determined. This specific number of low priority cache structures 208 may then be flushed 612.

Preferably, the demand load is constantly being monitored such that a change in the demand load causes a corresponding change in whether low priority cache structures 208 are flushed according to a first scheme or a second scheme. When there is a lower demand load and all the low priority cache structures 208 have been flushed 612 according to the second scheme, the method 600 ends 614.

As mentioned above, in a preferred embodiment, the second scheme selects low priority cache structures 208 in a manner directly opposite the manner of the first scheme. For example, a second scheme may flush low priority cache structures 208 that free the least amount of free space 406 and the first scheme may flush low priority cache structures 208 that free the greatest amount of free space 406.

Figure 7A:
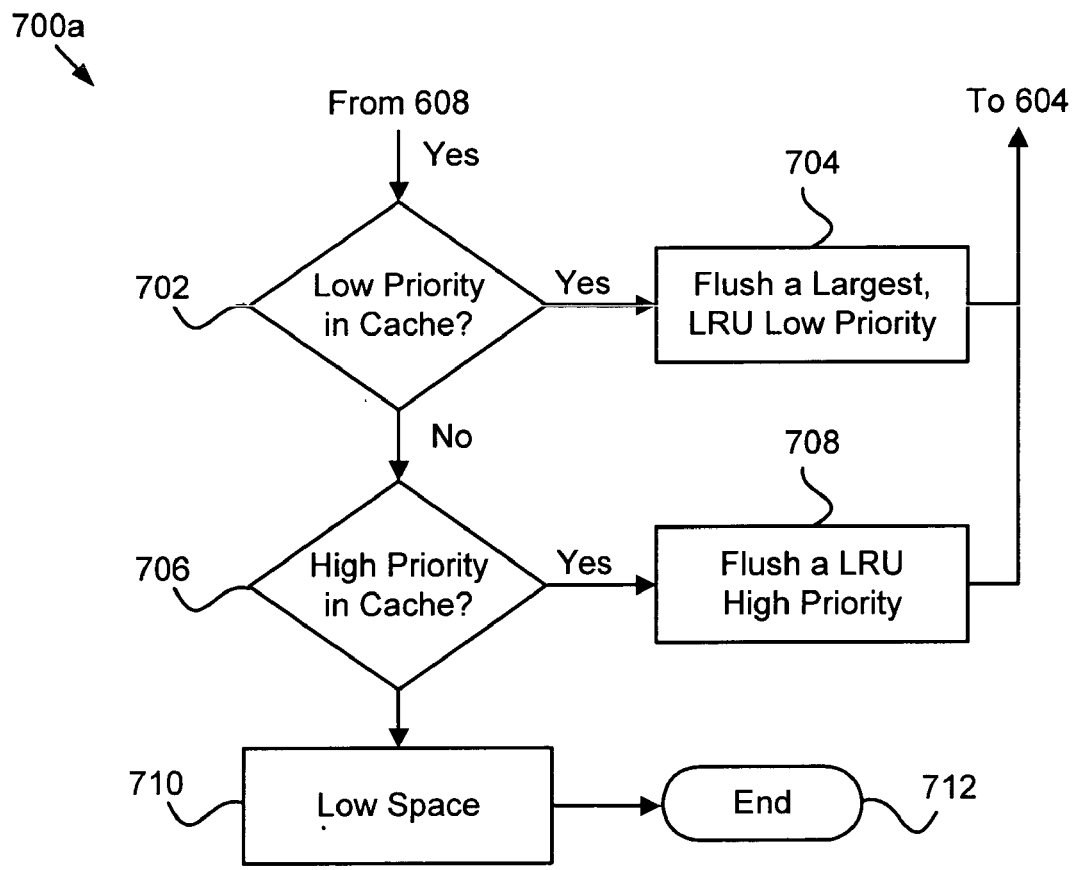
FIG. 7A is a schematic flow chart illustrating a first flushing scheme of a method for flushing data from a cache to secondary storage according to one embodiment of the present invention.

FIG. 7A illustrates a method 700a for flushing low priority cache structures 208 according to a first scheme. The method 700a begins when the determination 608 in method 600 is made that a VTS 104 is experiencing a higher demand load. First, a determination 702 is made whether low priority cache structures 208 are within the cache 206. If so, one or more low priority cache structures 208 that meet one or more selection criteria are selected and flushed 704 from the cache 206. As mentioned above, the selection criteria is typically based on characteristics such as size, flushing overhead required, the last time a cache structure 208 was requested, and the like. In the depicted embodiment, the largest, LRU cache structure 208 is flushed 704. Next, the method 700a returns to identify 604 high and low priority cache structures 208.

If there are no low priority cache structures 208 in the cache 206, a determination 706 is made whether there are high priority cache structures 208 in the cache 206. If so, a LRU high priority cache structure 208 is flushed 708. Next, the method 700a returns to identify 604 high and low priority cache structures 208.

If there are no LRU high priority cache structures 208 in the cache 206, the present invention may warn 710 of low storage space in the cache 206. Preferably, a low storage space condition is rare because as LRU cache structures 208 are flushed, new cache structures 208 are added to the cache 206. However, unless limited by other constraints, a single cache structure 208 may occupy substantially all the storage space in the cache 206. If a low space condition occurs, the method 700a ends 712.

Figure 7B:
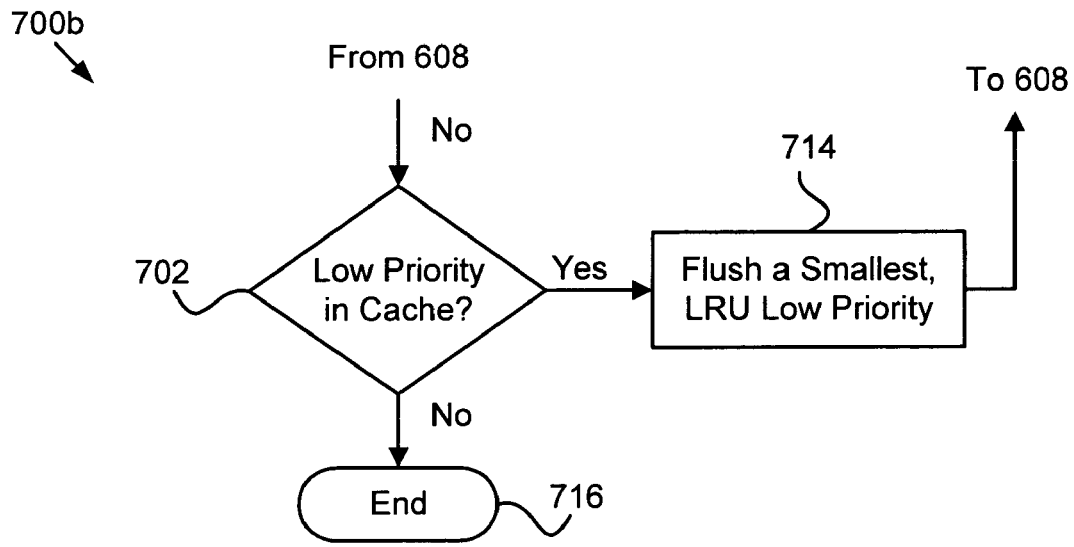
FIG. 7B is a schematic flow chart illustrating a second flushing scheme of a method for flushing data from a cache to secondary storage according to one embodiment of the present invention.

Referring now to FIG. 7B, method 700b illustrates how low priority cache structures 208 are flushed 612 according to a second scheme. The method 700b begins when it is determined 608 that there is a lesser demand load. First, a determination 702 is made whether low priority cache structures 208 are within the cache 206. If so, one or more low priority cache structures 208 that meet one or more selection criteria are selected and flushed 704 from the cache 206. Preferably, the selection criteria is the inverse of the selection criteria used to flush 704 a low priority cache structure 208 during a storage space demand. For example, a smallest LRU low priority cache structure 208 is flushed 714 from the cache 206. As mentioned above, the method 700b then returns to determine 608 the demand load as described in relation to FIG. 6.

If it is determined 702 that there are no low priority cache structures 208 in the cache 206, the method 700b ends 716. High priority cache structures 208 are not flushed from the cache 206 when there is substantially no demand load, such that the benefits of caching may be preserved for these high priority cache structures 208 and the overall efficiency of a VTS 104 improved.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for flushing data from a cache to secondary storage, the apparatus comprising:
   an identification module configured to identify predefined high priority cache structures and predefined low priority cache structures;
   a flushing module configured to selectively flush low priority cache structures according to a first scheme in response to a demand load and a second scheme in response to substantially no demand load; and
   wherein the first scheme selects a low priority cache structure that will free the most space in a cache and the second scheme selects a low priority cache structure that will free the least space in a cache.

2. The apparatus of claim 1, wherein selection criteria of the second scheme comprises the inverse of selection criteria of the first scheme.

3. The apparatus of claim 1, wherein the demand load comprises free space in a cache decreasing below a free space threshold.

4. The apparatus of claim 1, further comprising a sort module configured to order the low priority cache structures according to size.

5. The apparatus of claim 1, wherein the low priority cache structure selected according to the second scheme is larger than about four kilobytes.

6. An apparatus for flushing data from a cache to secondary storage, the apparatus comprising:
   a sort module configured to order predefined high priority cache structures and predefined low priority cache structures according to a first criteria and a second criteria;
   a flushing module configured to selectively flush low priority cache structures according to a first scheme in response to a demand load and a second scheme in response to substantially no demand load; and
   wherein the first scheme selects a low priority cache structure that will free the most space in a cache and the second scheme selects a low priority cache structure that will free the least space in a cache.

7. The apparatus of claim 6, wherein the first scheme selects a low priority cache structure according to an order opposite an order used under the second scheme.

8. The apparatus of claim 6, wherein the demand load comprises free space in a cache decreasing below a free space threshold.

9. The apparatus of claim 6 wherein the first criteria comprises a least recently used algorithm and the second criteria comprises a size algorithm.

10. The apparatus of claim 5, wherein the low priority cache structure selected according to the second scheme is larger than about four kilobytes.

11. A system for flushing data from a cache to secondary storage, comprising:
    a storage manager configured to transfer data between a host and a plurality of logical volumes corresponding to one or more physical volumes, the logical volumes identified as low priority and high priority;
    a media library configured to transfer data between a direct access storage device cache configured to cache logical volumes and one or more physical volumes; and
    a cache manager configured to manage logical volumes stored in the direct access storage device cache and selectively flush low priority logical volumes according to a first scheme in response to a demand load and a second scheme in response to substantially no demand back, wherein the first scheme selects a low priority cache structure that will free the most space in a cache and the second scheme selects a low priority cache structure that will free the least space in a cache.

12. The system of claim 11, wherein selection criteria of the second scheme comprises the inverse of selection criteria of the first scheme.

13. The system of claim 11, wherein the demand load comprises free space in the direct access storage device cache decreasing below a free space threshold.

14. The system of claim 11, further comprising ordering the low priority logical volumes according to size.

15. The system of claim 11, wherein the low priority logical volume selected according to the second scheme is larger than about four kilobytes.

16. A method for flushing data from a cache to secondary storage, comprising:
    identifying predefined high priority cache structures and predefined low priority cache structures;

selectively flushing low priority cache structures according to a first scheme in response to a demand load and a second scheme in response to substantially no demand loads; and wherein the first scheme selects a low priority cache structure that will free the most space in a cache and the second scheme selects a low priority cache structure that will free the least space in a cache.

17. The method of claim 16, wherein selection criteria of the second scheme comprises the inverse of selection criteria of the first scheme.

18. The method of claim 16, wherein the demand load comprises free space in a cache decreasing below a free space threshold.

19. The method of claim 16, further comprising ordering the low priority cache structures according to size.

20. The method of claim 16, wherein the low priority cache structure selected according to the second scheme is larger than about four kilobytes.

21. An apparatus for flushing data from a cache to secondary storage, comprising:

means for identifying predefined high priority cache structures and predefined low priority cache structures;

means for selectively flushing low priority cache structures according to a first scheme in response to a demand load and a second scheme in response to substantially no demand load; and wherein the first scheme selects a low priority cache structure that will free the most space in a cache and the second scheme selects a low priority cache structure that will free the least space in a cache.

22. The apparatus of claim 21, wherein selection criteria of the second scheme comprises the inverse of selection criteria of the first scheme.

23. The apparatus of claim 21, wherein the demand load comprises free space in a cache decreasing below a free space threshold.

24. An article of manufacture comprising a program storage medium readable by a processor and embodying one or more instructions executable by a processor to perform a method for flushing data from a cache to secondary storage, the method comprising:

identifying predefined high priority cache structures and predefined low priority cache structures;

selectively flushing low priority cache structures according to a first scheme in response to a demand load and a second scheme in response to substantially no demand load; and wherein the first scheme selects a low priority cache structure that will free the most space in a cache and the second scheme selects a low priority cache structure that will free the least space in a cache.

25. The article of manufacture of claim 24, wherein selection criteria of the second scheme comprises the inverse of selection criteria of the first scheme.

26. The article of manufacture of claim 24, wherein the demand load comprises free space in a cache decreasing below a free space threshold.

* * * * *